United States Patent
Xu et al.

(10) Patent No.: US 10,851,695 B2
(45) Date of Patent: Dec. 1, 2020

(54) EXHAUST GAS AFTERTREATMENT SYSTEM FOR DIESEL ENGINE AND METHOD OF DETECTING ABNORMAL INJECTION

(71) Applicant: Robert Bosch GmbH, Stuttgart (DE)

(72) Inventors: Yujiang Xu, Jiangsu (CN); Ling Li, Jiangsu (CN); Honglong Zhou, Jiangsu (CN); Siwei Dong, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/469,859

(22) PCT Filed: Dec. 16, 2016

(86) PCT No.: PCT/CN2016/110379
§ 371 (c)(1),
(2) Date: Jun. 14, 2019

(87) PCT Pub. No.: WO2018/107464
PCT Pub. Date: Jun. 21, 2018

(65) Prior Publication Data
US 2019/0316504 A1  Oct. 17, 2019

(51) Int. Cl.
  *F01N 3/18* (2006.01)
  *F01N 3/08* (2006.01)
  (Continued)

(52) U.S. Cl.
  CPC .............. *F01N 3/18* (2013.01); *F01N 3/085* (2013.01); *F01N 9/007* (2013.01); *F01N 11/00* (2013.01);
  (Continued)

(58) Field of Classification Search
  CPC . F01N 3/18; F01N 3/085; F01N 9/007; F01N 11/00; F01N 2550/00;
  (Continued)

(56) References Cited

U.S. PATENT DOCUMENTS 8,815,188 B2 *  8/2014  Yacoub ................ F01N 3/2066
                                                  423/212
8,931,258 B2 *  1/2015  Hodgson .............. F01N 3/208
                                                  60/286

(Continued)

FOREIGN PATENT DOCUMENTS

CN        104763498       7/2015
CN        205559029       9/2016
         (Continued)

OTHER PUBLICATIONS

International Search Report for Application No. PCT/CN2016/110379 dated May 12, 2017 (English Translation, 2 pages).

*Primary Examiner* — Hoang M Nguyen
(74) *Attorney, Agent, or Firm* — Michael Best & Friedrich LLP (57) ABSTRACT

Disclosed is an exhaust gas aftertreatment system (1) for a diesel engine, the exhaust gas aftertreatment system comprising: a treatment agent tank (2) for storing an exhaust gas treatment agent; a metering injection module (4), with the injection of the metering injection module (4) being controlled with a determined duty ratio signal according to a desired injection amount; a supply module (3) connected between the treatment agent tank (2) and the metering injection module (4) for supplying the exhaust gas treatment agent to the metering injection module (4); an exhaust gas treatment agent pipe (6) connected between the metering injection module (4) and the supply module (3); a pressure sensor for measuring the system pressure in the exhaust gas treatment agent pipe (6); and a controller (7); wherein the controller (7) is configured to receive a system pressure signal from the pressure sensor during injection of the metering injection module (4), and detect an injection abnormality of the metering injection module (4) based on at least a first amount, which represents an actual injection amount (Continued)

and is determined by the system pressure signal, and a second amount, which represents a theoretical injection amount and is determined by a corresponding duty ratio signal. A corresponding injection abnormality detection method is further disclosed. The injection abnormality detection method is simple and reliable.

10 Claims, 3 Drawing Sheets

(51) Int. Cl.
*F01N 9/00* (2006.01)
*F01N 11/00* (2006.01)

(52) U.S. Cl.
CPC ...... *F01N 2550/00* (2013.01); *F01N 2900/06* (2013.01)

(58) Field of Classification Search
CPC ......... F01N 2900/06; F01N 2900/0416; F01N 2900/0408; F01N 2900/1812; F01N 2900/1808; F01N 2610/146; F01N 2610/02; F01N 3/208; F01N 3/28
USPC .................................. 60/274, 277, 295, 324
See application file for complete search history.

(56) References Cited

U.S. PATENT DOCUMENTS

| | | | |
|---|---|---|---|
| 8,931,259 B2* | 1/2015 | Yan | F01N 3/208 60/286 |
| 9,021,791 B2* | 5/2015 | Barcin | F01N 3/18 60/274 |
| 2011/0083424 A1 | 4/2011 | Wang et al. | |
| 2013/0269418 A1* | 10/2013 | Peucat | F01N 3/208 73/37 |

FOREIGN PATENT DOCUMENTS

| | | |
|---|---|---|
| CN | 106014563 | 10/2016 |
| EP | 2131021 A1 | 12/2009 |
| WO | 2014134273 A1 | 9/2014 |

\* cited by examiner

EXHAUST GAS AFTERTREATMENT SYSTEM FOR DIESEL ENGINE AND METHOD OF DETECTING ABNORMAL INJECTION

BACKGROUND OF THE INVENTION

The present invention relates to an exhaust gas aftertreatment system for a diesel engine and an injection abnormality detection method therefor.

Diesel engines, due to their characteristics such as good reliability, high thermal efficiency and large output torque, are widely used in small, heavy or large vehicles, ships, generators, military tanks and other machines. However, due to a high content of nitrogen oxides in exhaust gas emitted by the diesel engines, it is required to treat the exhaust gas by a special exhaust gas aftertreatment system before being discharged into the atmosphere to meet the increasingly stringent environmental protection requirements.

In other words, in order to reduce air pollution, aftertreatment of exhaust gas from the diesel engines has become the standard equipment for the diesel engines. For the treatment of exhaust gas, it is generally carried out by a selective catalytic reduction method, in which a liquid reductant (typically an aqueous urea solution) is sprayed into a tailpipe in an aerosol form, and harmful gas in the exhaust gas is converted into harmless gas through selective catalytic reduction reaction and then discharged into the atmosphere, thus reducing the damage to the environment.

To this end, the exhaust gas aftertreatment system generally includes an exhaust gas treatment agent tank for storing an exhaust gas treatment agent, especially a liquid reductant, a metering injection module for injecting and metering the injected exhaust gas treatment agent, a supply module for supplying the exhaust gas treatment agent from the exhaust gas treatment agent tank to the metering injection module, and a controller for playing a control role.

In order to ensure that the exhaust gas aftertreatment system can work reliably, failures of the exhaust gas aftertreatment system should be detected in time to be eliminated in time. In particular, at present, some countries or regions even require, through legislation, vehicles to be manufactured with devices that can determine the amount of consumption of the exhaust gas treatment agent and obtain consumption information outside the vehicle, and at the same time, it is required that an abnormal situation with excessive deviation between an actual consumption amount and a desired consumption amount can be detected in a timely manner.

At present, the detection methods are mainly: 1) based on the decrease of a system pressure during injection; 2) based on the supply module with a metering function; 3) based on a liquid level sensor for measuring the liquid level in the exhaust gas treatment agent tank.

However, all these detection methods are affected by the following factors: 1) component deviation and aging; 2) layout of the metering system; 3) operating conditions, such as temperature; 4) driving states, such as sudden acceleration and climbing. These may lead to false detection and/or missing detection.

Therefore, there is an urgent need to improve the existing exhaust gas aftertreatment system to overcome at least one of the above disadvantages.

SUMMARY OF THE INVENTION

An object of the present invention is to provide an exhaust gas aftertreatment system for a diesel engine and an injection abnormality detection method therefor in order to at least partially solve the above technical problems.

According to a first aspect of the present invention, provided is an exhaust gas aftertreatment system for a diesel engine, the exhaust gas aftertreatment system comprising: a treatment agent tank for storing an exhaust gas treatment agent; a metering injection module, with the injection of the metering injection module being controlled with a determined duty ratio signal according to a desired injection amount; a supply module connected between the treatment agent tank and the metering injection module for supplying the exhaust gas treatment agent to the metering injection module; an exhaust gas treatment agent pipe connected between the metering injection module and the supply module; a pressure sensor for measuring the system pressure in the exhaust gas treatment agent pipe; and a controller; wherein the controller is configured to: receive a system pressure signal from the pressure sensor during injection of the metering injection module, and detect an injection abnormality of the metering injection module based on at least a first amount, which represents an actual injection amount and is determined by the system pressure signal, and a second amount, which represents a theoretical injection amount and is determined by a corresponding duty ratio signal.

According to an optional embodiment of the present invention, the amplitude of the predetermined operating frequency of the metering injection module is determined as the first amount by means of frequency analysis of a system pressure signal, preferably transformation from a time domain to a frequency domain, and the second amount is determined from the average value of the corresponding duty ratio signal according to the predetermined relation.

According to an optional embodiment of the present invention, the system pressure signal is transformed from the time domain to the frequency domain using a discrete Fourier transform.

According to a second aspect of the present invention, provided is an injection abnormality detection method for an exhaust gas aftertreatment system for a diesel engine, the exhaust gas aftertreatment system comprising: a treatment agent tank for storing an exhaust gas treatment agent; a metering injection module, with the injection of the metering injection module being controlled with a determined duty ratio signal according to a desired injection amount; a supply module connected between the treatment agent tank and the metering injection module for supplying the exhaust gas treatment agent to the metering injection module; an exhaust gas treatment agent pipe connected between the metering injection module and the supply module; a pressure sensor for measuring a system pressure in the exhaust gas treatment agent pipe; and a controller; and the method comprising the following steps of: receiving a system pressure signal from the pressure sensor and acquiring a corresponding duty ratio signal during injection of the metering injection module; and detecting, by the controller, an injection abnormality of the metering injection module based on at least a first amount, which represents an actual injection amount and is determined by the system pressure signal, and a second amount, which represents a theoretical injection amount and is determined by the corresponding duty ratio signal.

According to an optional embodiment of the present invention, a system pressure signal is received during continuous injection of the metering injection module.

According to an optional embodiment of the present invention, a deviation amount is determined by subtracting the second amount from the first amount; a relative deviation coefficient is determined by dividing the deviation amount by the second amount; and if the relative deviation coefficient is greater than a predetermined deviation threshold, it is at least initially determined that there is an injection abnormality, otherwise, it is considered that there is no injection abnormality.

According to an optional embodiment of the present invention, the predetermined relation is a linear relation.

According to an optional embodiment of the present invention, if the relative deviation coefficient is not greater than the predetermined deviation threshold, a counter returns to zero and waits for the next abnormality detection; otherwise, the counter is accumulated once and whether the value of the counter is greater than a first predetermined count threshold is determined; and if the value of the counter is greater than the first predetermined count threshold, it is determined that there is an injection abnormality, otherwise the next abnormality detection is awaited.

According to an optional embodiment of the present invention, if the relative deviation coefficient is not greater than the predetermined deviation threshold, the counter is decreased once and waits for the next abnormality detection; otherwise, the counter is accumulated once and whether the value of the counter is greater than a second predetermined count threshold is determined; and if the value of the counter is greater than the second predetermined count threshold, it is determined that there is an injection abnormality, otherwise the next abnormality detection is awaited.

The exhaust gas aftertreatment system and the injection abnormality detection method therefor of the present invention are simple and reliable.

BRIEF DESCRIPTION OF THE DRAWINGS

In the following, the principles, features and advantages of the present invention can be better understood by describing the present invention in more detail with reference to the accompanying drawings. In the drawings.

DETAILED DESCRIPTION

In order to make the technical problems to be solved by the present invention, technical solutions and beneficial technical effects more clear, the present invention will be described in further detail below with reference to the drawings and various embodiments. It should be understood that the specific embodiments described herein are only for the purpose of explaining the present invention and are not intended to limit the scope of protection of the present invention.

Figure 1:
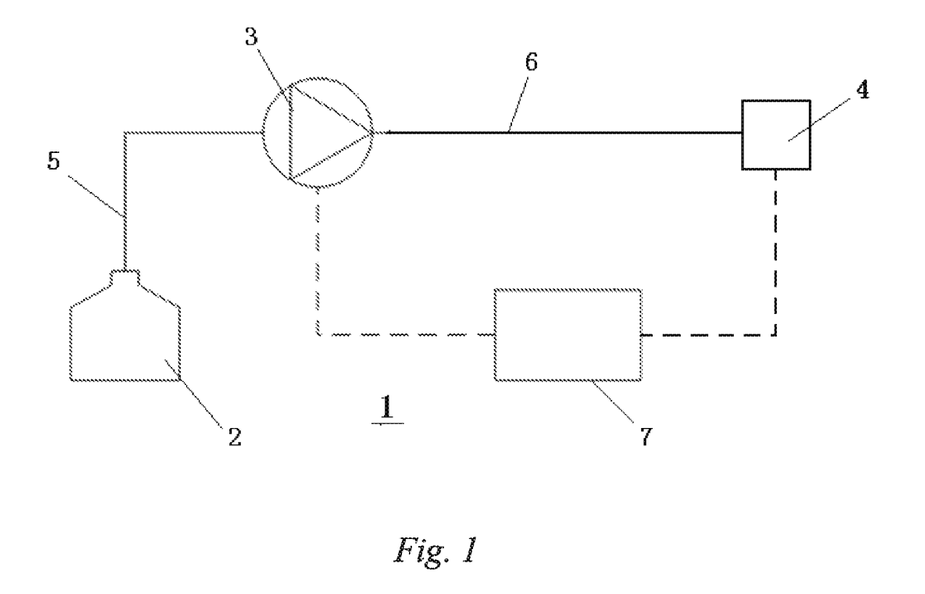
FIG. 1 shows a schematic diagram of the construction of an exhaust gas aftertreatment system for a diesel engine according to an exemplary embodiment of the present invention.

FIG. 1 shows a schematic diagram of the construction of an exhaust gas aftertreatment system for a diesel engine according to an exemplary embodiment of the present invention.

As shown in FIG. 1, an exhaust gas aftertreatment system 1 for a diesel engine includes an exhaust gas treatment agent tank 2 for storing an exhaust gas treatment agent, a supply module 3 for supplying the exhaust gas treatment agent from the exhaust gas treatment agent tank 2, a metering injection module 4 for injecting and metering the injected exhaust gas treatment agent, a pipeline 5 connected between the exhaust gas treatment agent tank 2 and the supply module 3, an exhaust gas treatment agent pipe 6 connected between the supply module 3 and the metering injection module 4, and a controller 7 that plays a control role.

The exhaust gas treatment agent is preferably a liquid reductant, such as an aqueous urea solution. As shown in FIG. 1, the supply module 3 is preferably a pump. During operation, the supply module 3 sucks the exhaust gas treatment agent from the exhaust gas treatment agent tank 2 through the pipeline 5, and then delivers the exhaust gas treatment agent to the metering injection module 4 through the exhaust gas treatment agent pipe 6 for injection.

The controller 7 is used to control components in the exhaust gas aftertreatment system 1 for the diesel engine, and these components may be the supply module 3 and/or the metering injection module 4. The controller 7 can also receive the operation status or measurement data of corresponding components, such as some sensors, through communication lines to monitor or control the operation of the exhaust gas aftertreatment system 1 for the diesel engine. The controller 7 may also be an electronic control unit (ECU) for a diesel engine or a separately provided component. When the controller 7 is a separately provided component, it is preferable to communicate with an electronic control unit of the diesel engine to receive data from the electronic control unit and transmit some data to the electronic control unit.

The injection abnormality detection of the metering injection module is particularly important for the exhaust gas aftertreatment system, because the injection abnormality of the metering injection module will directly affect an actual injection amount of the exhaust gas treatment agent, thus causing the deviation between the actual injection amount and a desired injection amount. This kind of injection abnormality may be caused by a real failure of the metering injection module or by a man-made failure. Real failures include not only a mechanical failure or blockage, but also an electrical connection failure. These failures will not only affect whether the exhaust gas treatment agent can be injected, but also affect the accuracy of the injection amount even if it can still be injected. At present, a common failure detection method is to measure the current flowing through the metering injection module when same works. Based on this current characteristic, for example, if the current changes abruptly and violently, it is considered that the metering injection module has a mechanical or electrical connection failure. However, this detection method is found to be inaccurate in practice, especially as it cannot accurately reflect the influence of the failure of the metering injection module on the injection amount, that is, the current detection method cannot provide any useful information for calculating the actual injection amount. At present, there is also no good detection method for a man-made failure, such as man-made blockage of an injection hole of the metering injection module, especially for the influence of this man-made failure on the injection amount.

However, whether from the legal requirements or from the operating requirements of the vehicle itself, excessive deviation between the actual injection amount and the desired injection amount should be detected in a timely manner. Next, the technical idea of the present invention will be described in detail with reference to the above-mentioned exhaust gas aftertreatment system.

As shown in FIG. 1, when in operation, the supply module 3 normally supplies the exhaust gas treatment agent from the exhaust gas treatment agent tank 2 to the exhaust gas treatment agent pipe 6 downstream of the supply module 3 at a target pressure through PID (proportional integral differential) control. After the system pressure is established in the exhaust gas treatment agent pipe 6, the metering injection module 4 can inject the exhaust gas treatment agent into a tailpipe according to a control command of the controller 7. Therefore, the system pressure in the exhaust gas aftertreatment system varies with the injection characteristics of the metering injection module 4, i.e., the system pressure is a function of the injection characteristics of the metering injection module 4.

First, since the operating frequency of the metering injection module 4 can be predetermined by the control of the controller 7, the operating frequency will affect the variation characteristics of the system pressure, especially the characteristics in variable frequency. In order to measure the system pressure, it is preferable that at least one pressure sensor is arranged at the exhaust gas treatment agent pipe 6 to measure the system pressure in the exhaust gas treatment agent pipe 6. Of course, the pressure sensor can also be arranged at the supply module 3 and/or the metering injection module 4 as long as it can reflect the system pressure in the exhaust gas treatment agent pipe 6. A measured system pressure signal can be acquired and analysed by the controller 7.

Figure 2:
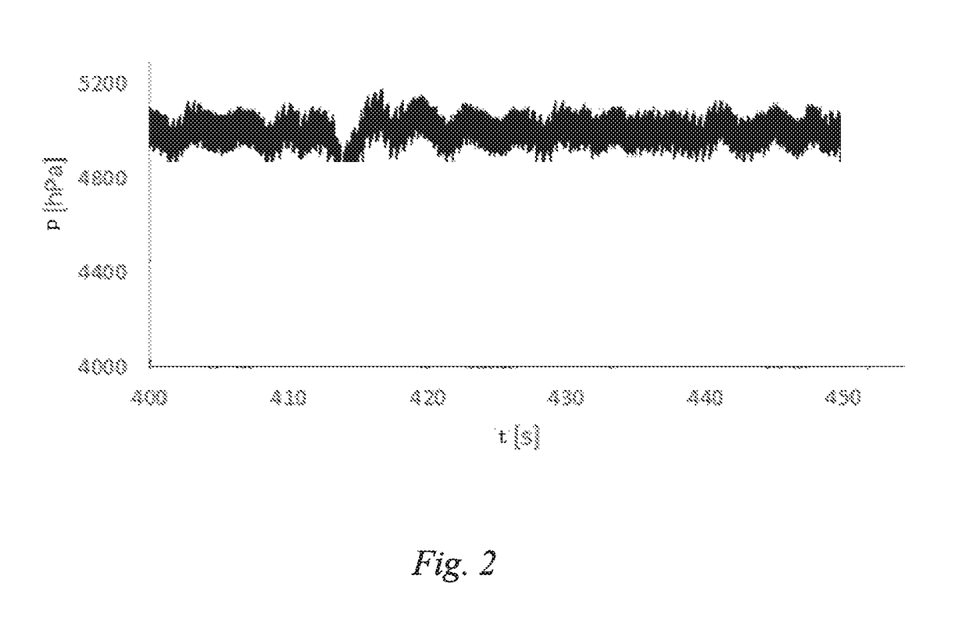
FIG. 2 shows a measured system pressure signal for a certain period of time.

Under normal circumstances, the metering injection module 4 operates at a predetermined operating frequency. Through frequency analysis of the acquired system pressure signal, it can be determined whether the metering injection module 4 operates at a predetermined operating frequency. FIG. 2 shows a measured system pressure signal for a certain period of time.

Figure 3:
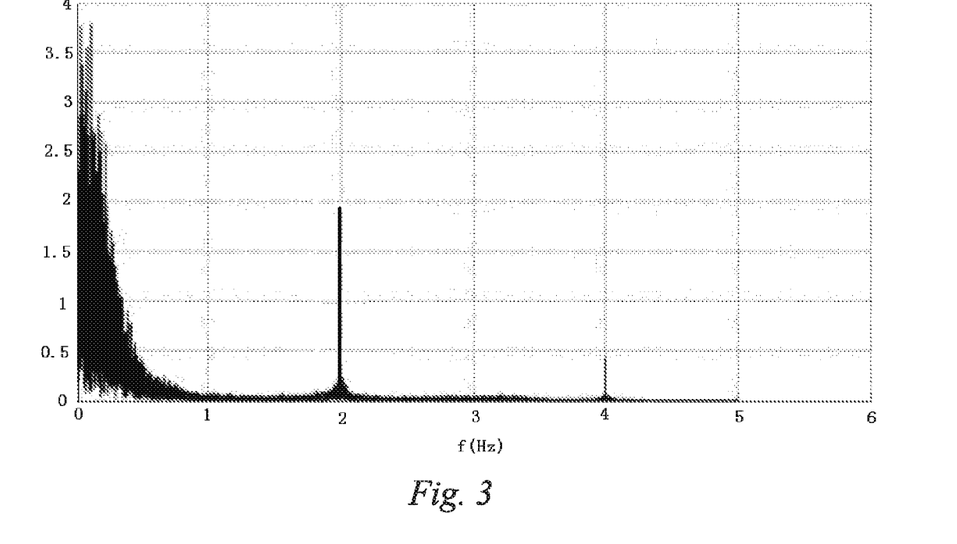
FIG. 3 shows a frequency analysis result of the system pressure signal shown in FIG. 2.
Figure 4:
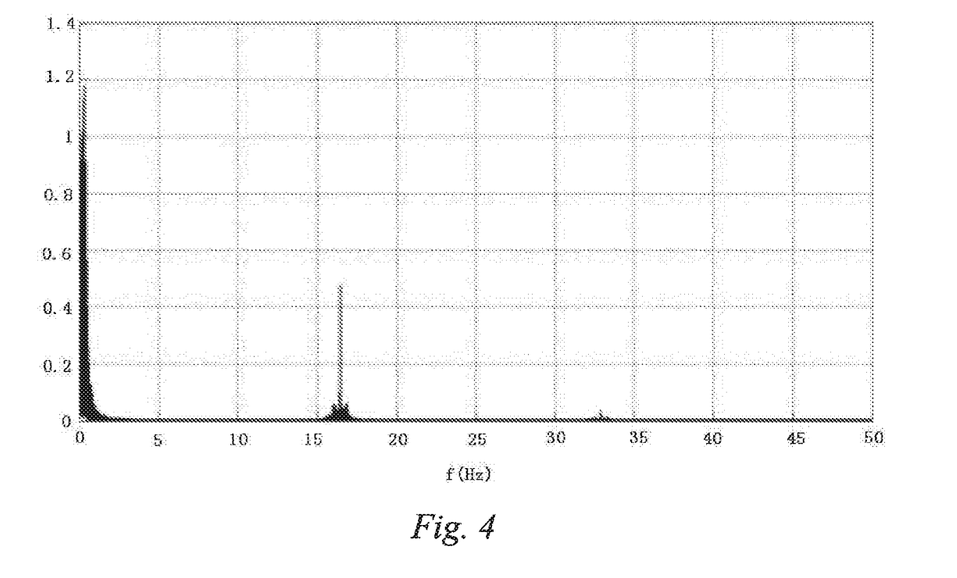
FIG. 4 shows a frequency analysis result of the system pressure signal when a metering injection module has a functional failure.

According to a preferred exemplary embodiment, frequency domain analysis is performed on the system pressure signal using a discrete Fourier transform (DFT), preferably a fast Fourier transform (FFT) or a Goertzel algorithm. In the transformed frequency domain, if the predetermined operating frequency, e.g., 2 Hz, has a significant amplitude, it at least indicates that the metering injection module 4 affects the system pressure at the predetermined operating frequency, as shown in FIG. 3. If the predetermined operating frequency has no obvious amplitude, it indicates that the metering injection module 4 can no longer affect the system pressure at the predetermined operating frequency, therefore, it can accordingly be considered at least initially that there is an abnormality in the metering injection module 4, as shown in FIG. 4, which generally means that the metering injection module 4 can no longer be mechanically opened or closed or the hole is completely blocked, i.e. a failure occurs.

Obviously, the discrete Fourier transform is just taken as an example to describe the frequency domain analysis of the system pressure signal, and in practice, any other suitable analysis method can also be used to transform the system pressure signal from a time domain to a frequency domain. It is not even necessary to transform to the frequency domain as long as a value reflecting the amplitude of the predetermined operating frequency of the system pressure signal can be determined, for example, by autocorrelation analysis.

As described above, the operating frequency of the metering injection module 4 can be predetermined by the controller 7, so 2 Hz as given above is only an example. In practice, any suitable operating frequency can be selected as required.

The desired injection amount is usually determined based on the operating state of the engine. The controller 7 controls the injection of the metering injection module 4 based on the determined desired injection amount, that is, it is desired that the metering injection module 4 injects the desired amount of exhaust gas treatment agent. Specifically, the controller 7 controls the injection of the metering injection module 4 with a corresponding duty ratio signal according to the desired injection amount. Obviously, the duty ratio signal will also affect the variation characteristics of the system pressure, and the larger the duty ratio, the longer the opening time of the injection hole of the metering injection module 4 in one injection cycle, i.e. the longer the injection time, the larger the fluctuation amplitude of the system pressure, and the fluctuation amplitude is generally proportional to the amplitude of the predetermined operating frequency of the system pressure signal in the frequency domain. Therefore, the duty ratio, i.e., the injection amount, is generally proportional to the amplitude of the predetermined operating frequency.

The system pressure signal within a period of continuous injection (e.g., 5.12 seconds) is acquired by a pressure sensor, and firstly, as shown in FIG. 3, frequency analysis is performed on the system pressure signal, then the average duty ratio (average injection amount) within the period of time is calculated, and then the amplitude of the predetermined operating frequency is acquired. These three steps are called a frequency analysis event. Obviously, the sequence of the above steps is merely exemplary and not limiting.

Figure 5:
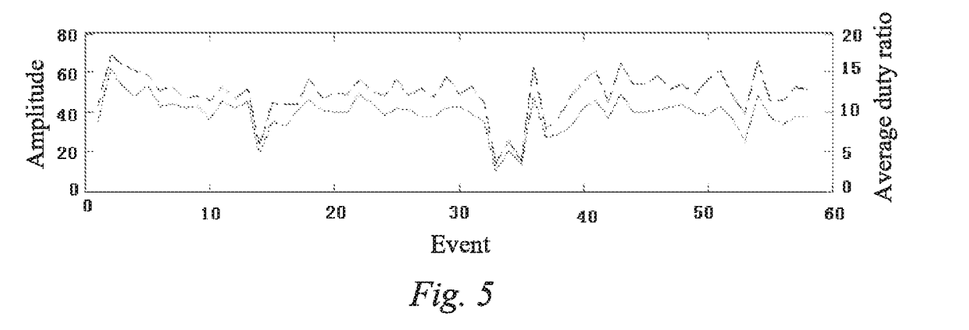
FIG. 5 shows a graph of the amplitude of a predetermined operating frequency of a series of frequency analysis events versus a respective average duty ratio, in which the dashed line represents the amplitude and the solid line represents the average duty ratio.

FIG. 5 shows a graph of the amplitude of a predetermined operating frequency of a series of frequency analysis events versus a respective average duty ratio, in which the dashed line represents the amplitude and the solid line represents the average duty ratio. As shown in FIG. 5, a good followability is shown between the amplitude of the predetermined operating frequency and the average duty ratio, that is, they are basically linearly related, which can be represented by the following formula (1):

$$A = kd \tag{1}$$

where A represents the amplitude of the predetermined operating frequency, k represents the proportional coefficient, and d represents the average duty ratio.

Obviously, the relationship between the amplitude of the predetermined operating frequency and the corresponding average duty ratio can also be established by experiment, simulation or experience, for example by fitting. The relationship between them is represented by the following general functional relation (2):

$$A = f(d) \tag{2}$$

where A represents the amplitude of the predetermined operating frequency, d represents the average duty ratio, and f represents the functional relationship.

In the detection process, the controller 7 determines the actual amplitude A1 of the predetermined operating frequency according to the system pressure signal, and determines the average duty ratio d at the same time. Then, the calculated theoretical amplitude A is determined by the above formula (2), more particularly formula (1), and in turn the difference ΔA=A−A1 between the theoretical amplitude A and the actual amplitude A1 can be determined.

According to a preferred exemplary embodiment of the present invention, abnormality is detected through relative deviation. For example, the relative deviation coefficient y is determined by the following formula (3):

$$y = \Delta A/A \qquad (3)$$

Preferably, a deviation threshold T is set, and if the determined relative deviation coefficient y is greater than the deviation threshold T, it is considered that there is an injection abnormality in this detection, otherwise it is considered to be normal. The deviation threshold T may be set to 50%, for example.

In addition, due to the influence of sample size, sampling frequency and other factors in the transformation from the time domain to the frequency domain, the frequency to be found may have a certain offset relative to the predetermined operating frequency in the transformed frequency domain. In addition, since a discrete analysis method is usually used, the discrete frequencies obtained by analysis may also not correspond to the predetermined operating frequency. To this end, for example, a target frequency interval can be set centering at a predetermined operating frequency, and the sum of the amplitudes for the target frequency interval can be calculated as the amplitude of the predetermined operating frequency.

According to an exemplary embodiment of the present invention, the position where the predetermined operating frequency corresponds to the frequency domain analysis result can be found by the following formula (4):

$$F_n = (n-1)\frac{F_s}{N-1} \qquad (4)$$

where $F_n$ represents a predetermined operating frequency, $F_s$, represents a sampling frequency, N represents a total number of samples, and n represents a position where the predetermined operating frequency corresponds to the frequency domain analysis result. At this time, the sum of the amplitudes of positions of the two integers closest to n before and after calculation is taken as the amplitude of the predetermined operating frequency. When n itself is an integer, the sum of the amplitudes of positions of the two integers before and after calculation and the n position may be taken as the amplitude of the predetermined operating frequency.

Figure 6:
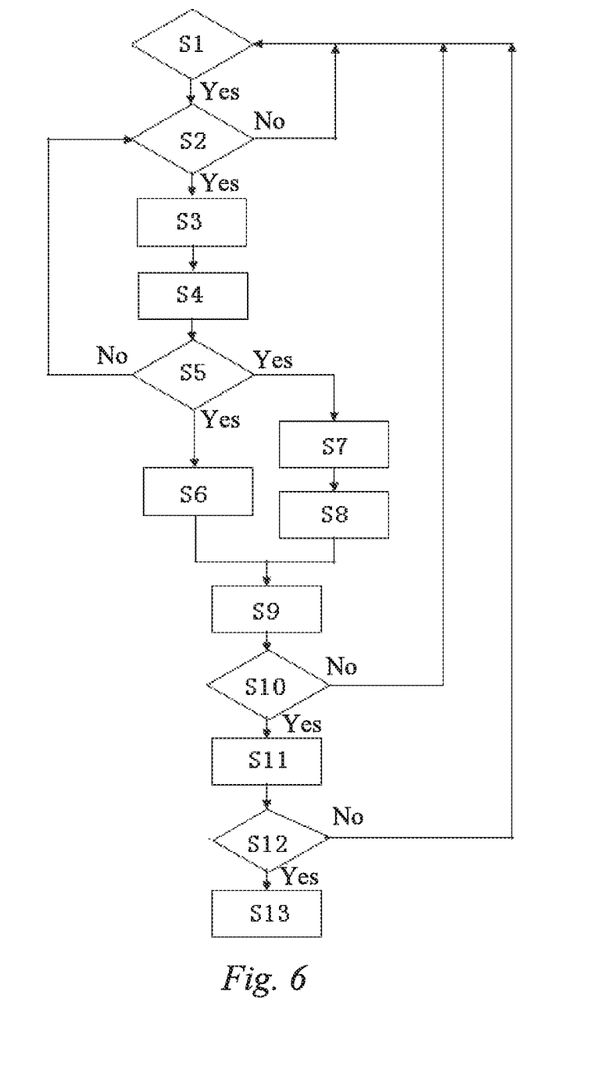
FIG. 6 shows a flow chart for detecting an injection abnormality of the metering injection module according to an exemplary embodiment of the present invention.

In order to further improve the accuracy and reliability of the detection, the injection abnormality detection can be performed on the metering injection module 4 according to the exemplary flow chart shown in FIG. 6.

As shown in FIG. 6, the detection process starts with step S1. If it is determined in step S1 that abnormality detection is to be performed, the process continues to step S2. In step S2, it is determined whether it is suitable to start acquiring system pressure signals for detection, that is, whether the detection start condition is satisfied. According to an exemplary embodiment, it is determined whether the detection start condition is satisfied by determining whether the current duty ratio is greater than a predetermined threshold. If it is greater than the predetermined threshold, the process proceeds to step S3, otherwise, the process returns to step S1 and waits for the next abnormality detection. In step S3, the controller 7 acquires the current system pressure signal from the pressure sensor and simultaneously acquires the duty ratio at that time. Then, the process proceeds to step S4, and in step S4, a first counter is accumulated once. Subsequently, the process proceeds to step S5, and in step S5, it is determined whether a predetermined number of sampling points has been reached. If the predetermined number of sampling points has not been reached, the process returns to step S2 to start the next sampling. If the predetermined number of sampling points is reached, the sampling is ended and the process proceeds to subsequent steps S6 and S7.

According to a preferred exemplary embodiment, the previously sampled system pressure signal and the obtained duty ratio are cleared before it is determined in step S2 that the detection start condition is not satisfied and returns to step S1. In this way, it can be ensured that all sampling for detecting an injection abnormality is implemented in a continuous injection process. In this case, the reliability and accuracy of the detection can be ensured.

The above steps may be collectively referred to as a process of acquiring a system pressure signal satisfying a predetermined condition and a corresponding duty ratio signal.

In step S6, analysis, preferably frequency domain analysis, is performed on the system pressure signal to obtain the actual amplitude A1 of the predetermined operating frequency. The actual amplitude A1 of the predetermined operating frequency can be preferably obtained by the method described above in connection with the formula (4).

In step S7, the duty ratio signal is analysed, and preferably calculated for an average value, to obtain an average duty ratio d. Next, in step S8, based on the average duty ratio d, the theoretical amplitude A is calculated by the above formula (2), more particularly the formula (1), and in turn the difference ΔA=A−A1 between the theoretical amplitude A and the actual amplitude A1 can be determined.

In step S9, the relative deviation coefficient y is preferably determined based on the formula (3). Next, in step S10, the relative deviation coefficient y is compared with the deviation threshold T. If the relative deviation coefficient y is greater than the deviation threshold T, it is at least considered that there is an injection abnormality at this time, otherwise it is considered that there is no injection abnormality, and the process returns to step S1 and waits for a next abnormality detection.

From step S6 to step S10, it may be collectively referred to as performing one injection abnormality detection based on the acquired system pressure signal and the corresponding duty ratio signal.

According to an exemplary embodiment, in order to further improve the reliability and accuracy of detections, as shown in FIG. 6, if it is determined in step S10 that the relative deviation coefficient y is greater than the deviation threshold T, the process proceeds to step S11. In step S11, a second counter is accumulated once. Next, in step S12, it is determined whether the value of the second counter is greater than a predetermined count threshold. If it is greater than the predetermined count threshold, the process proceeds to step S13 and determines that there is an injection abnormality in the metering injection module. Otherwise, the process returns to step S1 and waits for a next abnormality detection.

According to an optional exemplary embodiment, the second counter may return to zero to reduce false detection before determining in step S10 that the relative deviation coefficient y is not greater than the deviation threshold T and returning to step S1.

According to a further optional exemplary embodiment, the second counter may be decreased once to reduce false detection before determining in step S10 that the relative deviation coefficient y is not greater than the deviation threshold T and returning to step S1. At this time, the count threshold of the second counter can be set relatively small.

What has been described above in connection with FIG. 6 is only an exemplary embodiment, and new intermediate steps can be completely omitted, changed and/or introduced for those skilled in the art under the guidance of the technical idea of the present invention.

The basic idea of the present invention is to detect the injection abnormality of the metering injection module by analysing the system pressure signal and the duty ratio signal. The exhaust gas aftertreatment system and the corresponding injection abnormality detection method of the present invention are simple and reliable to operate.

Although specific embodiments of the present invention have been described in detail herein, they are given for the purpose of explanation only and should not be considered as limiting the scope of the present invention. Various substitutions, alterations and modifications may be devised without departing from the spirit and scope of the present invention.

The invention claimed is:

1. An exhaust gas aftertreatment system for a diesel engine, the exhaust gas aftertreatment system comprising:
   a treatment agent tank for storing an exhaust gas treatment agent;
   a metering injection module, with the injection of the metering injection module being controlled with a determined duty ratio signal at a determined frequency corresponding to a desired injection amount;
   a supply module connected between the treatment agent tank and the metering injection module for supplying the exhaust gas treatment agent to the metering injection module;
   an exhaust gas treatment agent pipe connected between the metering injection module and the supply module;
   a pressure sensor for measuring a system pressure in the exhaust gas treatment agent pipe; and
   a controller, wherein the controller is configured to:
      receive a system pressure signal from the pressure sensor during injection of the metering injection module,
      determine a frequency domain amplitude of the system pressure signal at the determined frequency of the determined duty ratio signal corresponding to the desired injection amount, and
      detect an injection abnormality of the metering injection module based on at least a deviation between a first amount and a second amount,
         wherein the first amount represents an actual injection amount and is determined based on the frequency domain amplitude of the system pressure signal at the determined frequency of the determined duty ratio signal corresponding to the desired injection amount, and
         wherein the second amount represents the desired injection amount corresponding to the determined ratio signal.

2. The exhaust gas aftertreatment system of claim 1, wherein the controller is further configured to determine the frequency domain amplitude of the system pressure signal at the determined frequency of the determined duty ratio signal corresponding to the desired injection amount includes applying a frequency analysis of the system pressure signal, and
   wherein the controller is further configured to determine the second amount based on an average value of the corresponding duty ratio signal according to a predetermined relation.

3. The exhaust gas aftertreatment system of claim 1, wherein the controller is further configured to transform the system pressure signal from a time domain to a frequency domain, and wherein the controller is configured to determine the frequency domain amplitude of the system pressure signal at the determined frequency based on the transformed system pressure signal in the frequency domain.

4. The exhaust gas aftertreatment system of claim 3, wherein
   (a) the system pressure signal is transformed from the time domain to the frequency domain using a discrete Fourier transform;
   (b) the injection abnormality of the metering injection module is detected according to the relative deviation of the first amount and the second amount over a period of time;
   (c) the controller is a separately provided controller or an electronic control unit of the diesel engine;
   or a combination of (a), (b), and (c).

5. An injection abnormality detection method for an exhaust gas aftertreatment system for a diesel engine, the exhaust gas aftertreatment system including
   a treatment agent tank for storing an exhaust gas treatment agent;
   a metering injection module, with the injection of the metering injection module being controlled with a determined duty ratio signal according to the desired injection amount;
   a supply module connected between the treatment agent tank and the metering injection module for supplying the exhaust gas treatment agent to the metering injection module;
   an exhaust gas treatment agent pipe connected between the metering injection module and the supply module;
   a pressure sensor for measuring the system pressure in the exhaust gas treatment agent pipe; and
   a controller, and
the method comprising:
   receiving a system pressure signal from the pressure sensor;
   determining a frequency of the determined duty ratio signal corresponding to the desired injection amount applied to the metering injection module during injection;
   determining a frequency domain amplitude of the system pressure signal at the determined frequency of the determined duty ratio signal corresponding to the desired injection amount; and
   detecting, by the controller, an injection abnormality of the metering injection module at least based on a deviation between a first amount and a second amount,
      wherein the first amount represents an actual injection amount and is determined based on the frequency domain amplitude of the system pressure signal at the determined frequency of the determined duty ratio signal corresponding to the desired injection amount, and
      wherein the second amount represents the desired injection amount corresponding to the determined duty ratio signal.

6. The injection abnormality detection method of claim 5, wherein determining the first amount includes applying a frequency analysis of the system pressure signal, and wherein the second amount is determined based on an average value of the corresponding duty ratio signal according to predetermined relation.

7. The injection abnormality detection method of claim 5, the method further comprising:
- determining a deviation amount by subtracting the second amount from the first amount;
- determining a relative deviation coefficient by dividing the deviation amount by the second amount; and
- determining that the injection abnormality is present in response to determining that the relative deviation coefficient is greater than a predetermined deviation threshold.

8. The injection abnormality detection method of claim 6, wherein
- (a) the predetermined deviation threshold is 50%;
- (b) the predetermined relation is a linear relation;
- or a combination of (a) and (b).

9. The injection abnormality detection method of claim 7, the method further comprising:
- enabling a counter to return to zero and waiting for the next abnormality detection in response to determining that the relative deviation coefficient is not greater than the predetermined deviation threshold;
- accumulating the counter once in response to determining that the relative deviation coefficient is greater than the predetermined deviation threshold; and
- determining whether the value of the counter is greater than a first predetermined count threshold;
- wherein determining that the injection abnormality is present further includes determining that the injection abnormality is present in response to determining that the value of the counter is greater than the first predetermined count threshold.

10. The injection abnormality detection method of claim 5, further comprising:
- transforming the system pressure signal from the time domain to the frequency domain;
- setting a target frequency interval centered at the determined frequency of the determined duty ratio signal corresponding to the desired injection amount applied to the metering injection module; and
- calculating the first amount as a sum of all frequency domain amplitudes of the system pressure signal for the target frequency interval.

* * * * *